United States Patent [19]

Bellazzi

[11] Patent Number: 4,919,682
[45] Date of Patent: Apr. 24, 1990

[54] METAL CLAMP FOR JOINING PIPES

[75] Inventor: Emilio Bellazzi, Milan, Italy

[73] Assignee: Arcelli & Bernacchi Srl., Milan, Italy

[21] Appl. No.: 356,919

[22] Filed: May 25, 1989

[30] Foreign Application Priority Data

May 26, 1988 [IT] Italy ................................ 20739 A/88

[51] Int. Cl.⁵ .............................................. B65D 63/02
[52] U.S. Cl. ................................. 24/20 R; 24/20 EE
[58] Field of Search ............ 24/20 R, 20 CW, 20 TT, 24/20 EE, 20 S, 20 W, 23 R, 23 EE; 285/252

[56] References Cited

U.S. PATENT DOCUMENTS

| | | | |
|---|---|---|---|
| 1,705,895 | 3/1929 | Blair | 24/20 CW |
| 2,095,661 | 10/1937 | Dutcher | 24/20 R |
| 3,189,961 | 6/1965 | Heller | 24/20 TT |
| 4,308,648 | 1/1982 | Fay | 24/20 R |
| 4,402,113 | 9/1983 | Smith | 24/20 R |
| 4,517,708 | 5/1985 | Calmettes et al. | 24/20 CW |
| 4,742,600 | 5/1988 | Calmettes et al. | 24/20 R |
| 4,821,379 | 4/1989 | Spaulding | 24/20 EE |

FOREIGN PATENT DOCUMENTS

| | | | |
|---|---|---|---|
| 487202 | 12/1929 | Fed. Rep. of Germany | 24/20 EE |
| 1318688 | 1/1963 | France | 24/20 CW |
| 798356 | 7/1958 | United Kingdom | 24/20 CW |

Primary Examiner—Victor N. Sakran
Attorney, Agent, or Firm—Armstrong, Nikaido, Marmelstein, Kubovcik & Murray

[57] ABSTRACT

A substantially cylindrical shaped metal clamp suitable for joining co-axial pipes, is disclosed and outlined. Said clamp is made from a base strap which is bent in two positions rather close to its ends, one of said bends developing on a non-radial axis and having the end near the other bend, which may be also a radial one, extending for a short straight line having an open bend end which, on locking, hooks on to the non-radial bend close to the other end of the clamp.

The base strap forming the clamp has two wide wave shaped laps which, because adjacent, give the strap an 'm' shape, said 'm'-shaped portion, which is lightened by a central lengthwise slit, is situated at the strap end bearing the straight hooking arm.

2 Claims, 1 Drawing Sheet

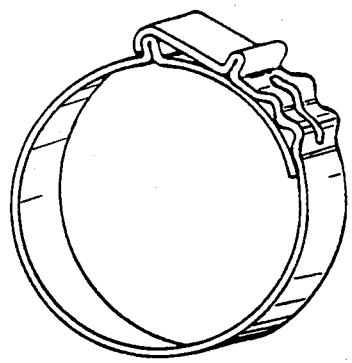
FIG. 1
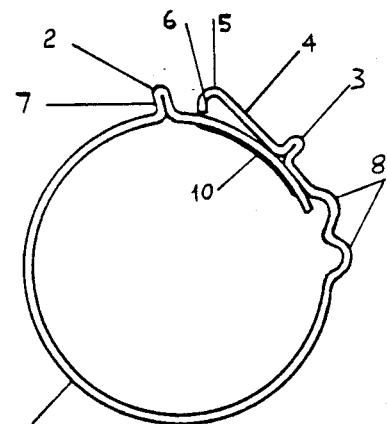
FIG. 2
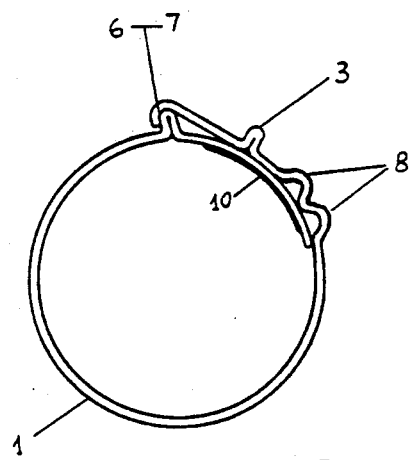
FIG. 3
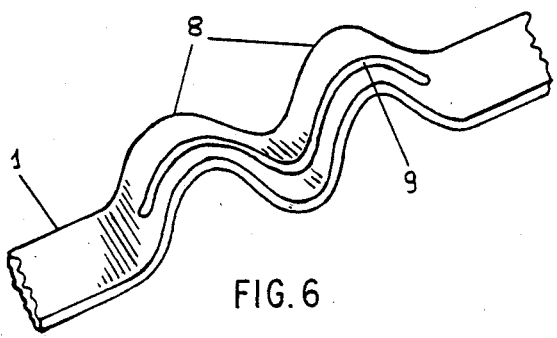
FIG. 6
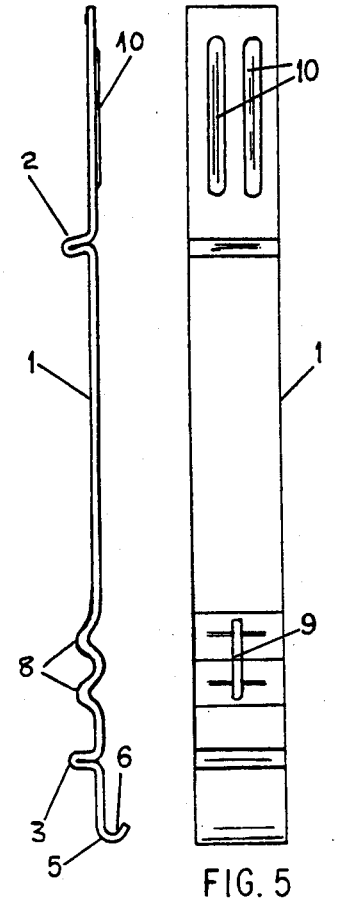
FIG. 4
FIG. 5

METAL CLAMP FOR JOINING PIPES

The present invention relates to a substantially cylindrical-shaped metal clamp made from a strap, suitable for locking joints of two co-axial conducts or pipes, the external pipe being obtained from a suitably deformable material, so that a deformation of the outer pipe, on locking, occurs under the clamp pressure, thus assuring a perfect join of the pipes.

The main peculiarity of the connection between pipes is to assure a perfect sealing not only on locking and in normal operating conditions, but also in anomalous ones such as those caused by vibrations, knocks, pressure increases in the fluid flow inside the pipes, different thrusts in the connected pipes and finally in conditions occuring sometime after the locking when the properties of the external pipe may have changed as a result of aging.

Perfect sealing is assured only when the clamp causes, even in anomalous operating conditions, a uniform pressure on the whole external pipe made from a deformable material.

A differential or variation in clamp pressure would cause a possible detachment of the joint, where the clamp pressure is too low, and a useless squeezing of the deformable pipe, which might cause permanent tearing, where the clamp pressure is too high.

If perfect joint sealing between two pipes is the fundamental feature to be achieved in a joint, it is also necessary that suitable means of ensuring such sealing be of easy application, smooth and quick assembly and also inexpensive to be manufactured.

Many devices have been made in order to achieve said peculiarities, but it is not always possible to obtain economically acceptable embodiments.

The metal clamp object of the present invention represents a good solution, because it combines an excellent funtioning—perfect sealing in the most varied conditions—with a very easy application, to a simple and economical manufacture.

For a better description of the metal clamp of the invention reference is made to the attached drawings which, however, should not be considered limiting the invention itself.

FIG. 1 is an axonometric perspective view of the metal clamp already locked,

FIG. 2 is a front view of the metal clamp just before locking (pre-locking),

FIG. 3 is a front view of the metal clamp already locked,

FIG. 4 is a side view of the metal clamp in its straight development,

FIG. 5 is a front view of the metal clamp in its straight development, and

FIG. 6 shows the clamp portion in which two adjacent waves give the strap—and the clamp—the 'm' shape.

The drawings show: an elongate base strap 1; bend 2, developing on a non-radial axis; bend 3 which may develop on a radial axis; a straight elastic arm 4 and an open bent-end or hook 5. The hook 5 has an internal part 6 which, when the clamp is hooked, must be co-planar with part 7, external to bend 2. The two adjacent waves 8, which give the clamp in that position a peculiar 'm' shape, are well outlined, especially in FIG. 5, which shows them in detail.

The clamp portion near the two waves bears a longitudinal cut or slit 9 made along the axis, and extending through the entire clamp thickness.

In the drawings only two waves 8 are shown, not in a limiting way, but these may be in a number from 2 to 4.

In a preferred embodiment of the clamp of the invention, as shown in the attached drawings, the end near the non-radial bend 2 is reinforced by ribs 10.

To join two co-axial pipes, the clamp is applied in a very simple way with clamping pliers which act on the bends 2 and 3 in order to move hook 5 near bend 2. The peculiar non-radial slant of bend 2 enables arm 4, made elastic by bend 3, to easily surmount bend 2 and go down on the other side of the said bend 2, while the hook portion 6 runs along the portion 7 of the bend 2 until the final locking position is reached, in which the co-planarity of the surfaces of the portions 6 of hook 5 and 7 of bend 2, occurs with the straight arm extending substantially tangential to the circumference of the band as shown in FIG. 3.

A feature of fundamental importance during the locking is provided by the 'm' shaped clamp portion 8, which adds elasticity and, therefore, a smooth application of the clamp. Again, in final locking position, the peculiar non-radial slant of bend 2 is important as it allows an extremely effective locking.

The peculiar hook 5-bend 2 coupling is able to absorb all forces exerted thereon, both in the normal joint working conditions and in particular temporary ones, due to vibrations, knocks, pressure increases in fluid flow inside the pipes, different thrusts on the two pipes, deformation in the pipe made from deformable material et cetera.

The 'm' shaped clamp portion having the two waves 8 is of basic importance. It allows the clamp, whatever the hardness of the deformable pipe material is, to completely adhere to it and, therefore, to exert a uniform pressure at every point, which is an essential condition for preventing joint detachment, where the clamp pressure is too low, as well as a useless squeezing of the deformable pipe, where the clamp pressure is too high.

When the deformable pipe is made from hard material, such as hard rubber, the 'm' shaped clamp portion, which is particularly elastic because of the cut or slit 9, stretches so as to lie on the pipe. This considerable stretching of the 'm' shaped clamp portion does not occur when the pipe is made from soft material, though stretching accurs to such an extent to ensuring a uniform pressure exerted by the metal clamp on the external deformable pipe and, therefore, a perfect joint sealing.

What we claim is:

1. A metal clamp for joining radially inner and outer axially aligned conduits wherein the outer conduit is made from a deformable material comprising:

an elongate base strap having two ends with one end formed as a hook having a surface facing the other end of said strap and overlapping the other end of said strap to provide a substantially cylindrical shaped metal clamp, a non-radial bend folded in said base strap adjacent said other end and providing a surface extending outwardly at an angle diverging away from said one overlapping end, a second bend folded in said base strap adjacent said one end of said base strap, a straight section of said base strap between said hook and said second bend, at least two wave-shaped bends in said base strap adjacent said second bend, and a central lengthwise slit traversing said wave-shaped bends, whereby said one end of said base strap is movable relative to said other end to engage said hook and said non-radial bend with said surface of said hook opposed to and substantially co-planar with said surface of said non-radial bend and said straight section of said base strip extending substantially tangential relative to said metal clamp.

2. A metal clamp as defined by claim 1 wherein four wave-shaped bends are provided in said base strip.

* * * * *